(12) United States Patent
König

(10) Patent No.: US 7,844,571 B2
(45) Date of Patent: Nov. 30, 2010

(54) METHOD AND DATA NETWORK FOR MANAGING MEDICAL IMAGE DATA

(75) Inventor: Helmut König, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 258 days.

(21) Appl. No.: 11/878,095

(22) Filed: Jul. 20, 2007

(65) Prior Publication Data

US 2008/0021931 A1  Jan. 24, 2008

(30) Foreign Application Priority Data

Jul. 21, 2006  (DE) .................. 10 2006 033 861

(51) Int. Cl.
*G06F 17/00* (2006.01)
(52) U.S. Cl. .................................... 707/602
(58) Field of Classification Search .................. 707/602
See application file for complete search history.

(56) References Cited

U.S. PATENT DOCUMENTS

| 4,653,112 | A | * | 3/1987 | Ouimette | ...................... 382/128 |
| 5,950,207 | A | * | 9/1999 | Mortimore et al. | ....... 707/104.1 |
| 6,683,933 | B2 | | 1/2004 | Saito et al. | |
| 6,762,763 | B1 | | 7/2004 | Migdal et al. | |
| 2003/0156745 | A1 | | 8/2003 | Saito et al. | |
| 2004/0141661 | A1 | * | 7/2004 | Hanna et al. | ................. 382/305 |
| 2005/0108365 | A1 | * | 5/2005 | Becker et al. | ................ 709/219 |
| 2005/0149534 | A1 | * | 7/2005 | Brackett et al. | ............. 707/100 |
| 2007/0147671 | A1 | * | 6/2007 | Di Vincenzo et al. | ........ 382/128 |
| 2007/0230829 | A1 | * | 10/2007 | Sirohey et al. | .............. 382/299 |

FOREIGN PATENT DOCUMENTS

| DE | 10344810 | 4/2005 |
| DE | 10351317 | 6/2005 |
| WO | WO 2001/03067 A1 | 1/2001 |

OTHER PUBLICATIONS

German Patent Office Action dated Apr. 29, 2008.

* cited by examiner

*Primary Examiner*—Robert Timblin
*Assistant Examiner*—Mohammed R Uddin
(74) *Attorney, Agent, or Firm*—Harness, Dickey & Pierce, P.L.C.

(57) ABSTRACT

To increase the efficiency of the management of image data in a data network including a multiplicity of network nodes, at least one embodiment of the present invention provides for image data, having been stored at a network node provided as a buffer store, to be transmitted for archiving to a network node provided as an archive store and to be stored there, with the storage of the respective image data in the buffer store and in the archive store involving a reference to the respective network node being recorded in an index in conjunction with an explicit identifier for the respective image data. Further, in at least one embodiment, the index is used when the stored image data are subsequently loaded to ascertain the respective at least one network node at which the respective image data are stored.

38 Claims, 2 Drawing Sheets

METHOD AND DATA NETWORK FOR MANAGING MEDICAL IMAGE DATA

PRIORITY STATEMENT

The present application hereby claims priority under 35 U.S.C. §119 on German patent application number DE 10 2006 033 861.8 filed Jul. 21, 2006, the entire contents of which is hereby incorporated herein by reference.

FIELD

Embodiments of the present invention generally relate to a method and/or a data network for managing medical image data.

BACKGROUND

In modern medical engineering, medical image data are produced digitally in a wide variety of ways. Very widespread use is made of the production of medical image data by diagnostic modalities, such as computer tomographs, digital X-ray equipment, magnetic resonance imaging equipment and digital ultrasound equipment. Furthermore, medical image data are also produced by scanning in conventional X-ray films. Image data may also be in the form of endoscopically produced video films. In many instances of application, such as in a hospital, the medical image data are transmitted via a data network. In this data network, the modalities are often tied directly as network nodes. The modalities transmit the medical image data produced there to workstations for viewing and editing the medical image data and archive stores, for example, which are each also network nodes. Such data networks usually comprise a picture archiving and communication system (PACS). Particularly the storage, loading and transmission of the image data within the data network will subsequently be combined under the term "management".

In the course of the technical development of the imaging systems, the volume of data which are transmitted in medical data networks has increased significantly. Particularly large volumes of data arise in sectional image diagnostics for multirow computer tomography or functional nuclear spin tomography. The increased spatial and temporal resolution means that volumes of data going into a two-digit gigabyte range arise. The transmission of such large volumes of data in the data network and the storage thereof in a memory within this data network represent a technical challenge. In particular, it is a problem transmitting the image data to the network node, such as a findings workstation, in real time and storing these volumes of data locally at sufficient speed. The respective modality as the source of the image data therefore often encounters a backlog in the transmission of the image data in the data network.

Currently, this problem is overcome by transmitting some of the data with a time delay, for example, if there is sufficient transmission bandwidth available in the data network. However, this neither reduces the total volume of image data to be transmitted nor speeds up the transmission of the image data per se.

To allow image data to be made available to a particular network node, such as a findings workstation, and displayed there in real time, it is possible to transmit the image data in rule-based fashion prior to a request to load the image data to the respective computer node. This rule-based transmission of the image data is also called "prefetching". Prefetching assumes that it is already known in advance at what computer node the respective image data are required. The transmission rules are stipulated on the basis of organizational structures and processes, for example.

If these are not known or if the respective individual request differs from an expected behavior then prefetching is not a possible solution. In addition, the total amount of the data volume is not reduced by this method. In fact, the volume of data to be transmitted may even increase by virtue of the respective data being transmitted more or less as a precaution and, in the end, possibly not actually being needed at the respective computer node.

Particularly when viewing image data on a workstation, the display of the respective medical images can be speeded up by initially transmitting only portions of the respective image data which suffice for the display of an image at relatively low resolution or image quality. While this first coarse image is already being shown, the rest of the image data are transmitted retrospectively, so that finally the respective image can be shown at full resolution or image quality. This type of loading of image data is also called "progressive loading". This type of image transmission can be used in appropriate fashion only to show the images but not to archive the images in a memory. Furthermore, even when the image data are displayed, the total volume of the image data to be transmitted is reduced by little or even not at all, depending on the respective specific method.

Specifically for 3D volume data, it is a known option to store these data at a network node in the form of a central server with a high level of processing power and to transmit to the remaining network nodes only 2D views of the 3D volume data which have been calculated by the central server. To this end, the respective data node sending a request to load the respective 2D image data to the central server sends respective specific 2D projection parameters for calculating the 2D projection view to the central server. To transmit the complete 3D volume data from the modality to a respective archive store, it is not possible to use this method.

SUMMARY

In at least one embodiment, the invention is based on the problem of allowing efficient management of medical image data in a computer network having a multiplicity of network nodes.

The stated problem is improved upon or even solved by at least one embodiment of a method and/or by a data network.

The text below first of all predominantly discusses the description and statement of advantage of at least one embodiment of the method and the refinements of the method.

These advantages are obtained essentially from the relevant refinements of at least one embodiment of the data network too. Reference is made generally to the fact that the data network can be refined using corresponding features of the method, and vice versa. For a detailed description of the data network and its refinements, reference is made to the description of the figures.

The method of at least one embodiment, for managing medical image data in a data network having a multiplicity of network nodes includes three management processes. The first management process is provided for buffer-storing the image data; in this management process, the respective image data are stored at a network node provided as a buffer store. The second management process is provided for archiving the image data; in this management process, the respective image data are transmitted from the buffer store to a network node provided as an archive store and are stored in this archive store. The buffer-storage of the image data permits efficiency particularly in respect of rapid storage of a large volume of data which has arisen in a short time in the buffer store, which in this function is a data buffer.

By recording a reference to the respective network node at which the respective image data are stored in conjunction with an explicit identifier for the respective image data in an index, it is possible in the third management process, which is provided for loading the image data, to use the index to ascertain the at least one network node at which the respective image data are stored, so that the respective image data can be loaded from this at least one network node. Since the index, as a network node, records both the buffer store and the archive store, the image data can potentially be loaded from both stores. Thus, the buffer store can be used not only as a buffer from the original data source, e.g. a modality, to the archive store, but also allows the image data to be loaded from the buffer store within the data network. This distributed storage of the image data allows flexible access to the image data, so that the data network can be used more efficiently.

In the inventive data network of at least one embodiment including a multiplicity of network nodes for managing medical image data, there is not only the buffer store and the archive store but also a management component firstly for recording the references to the respective network nodes in the index and secondly for ascertaining the network nodes from which the respective image data can be loaded, using the index.

In particularly simple fashion, the network nodes at which the respective image data to be loaded are stored are ascertained from their explicit identifier using the index.

Transmitting only previously selected image data from the buffer store to the archive store reduces the volume of data to be transmitted and thereby allows more efficient use of the data bandwidth of the network.

Deleting the unselected image data releases storage space for newly added image data in the buffer store. Delayed deletion on the basis of remaining storage space in the buffer store and/or on the basis of a particular time interval elapsing from transmission of the image data to the archive store device that the respective image data are available for loading for a certain period both in the buffer store and in the archive store. In addition, this allows the image data to be loaded from both memories, so that the respective faster memory can be accessed in a single case.

Advantageously, not only the respective explicit identifier for the image data but also image-related supplementary data are recorded in the index; thus the index comprehensively provides information about the image data stored in the memories.

In line with another refinement of at least one embodiment of the invention, provision is made for the supplementary data recorded in the index to be taken as a basis for searching for particular image data; in this case, the at least one network node at which the respective image data complying with the search criteria for the supplementary data are stored is ascertained using the index. This allows, inter alia, particularly rapid access to image data whose explicit identifier is initially not known. In particularly simple fashion, provision is made for image data based on the DICOM standard to be used and for the index to record supplementary data in the form of the respective DICOM metadata associated with the image data. In particular, provision is made for DICOM metadata in the form of an identifier for the respective patient, for the respective study, for the respective series and/or for the respective instance of the image data to be recorded.

The study, series and instance form the usual hierarchy in which image data based on the DICOM standard are produced; an instance is a single image in an image series, for example.

In a particularly simple manner, the explicit identifier recorded is a respective "unique identifier" based on the DICOM standard. In line with the DICOM standard, various hierarchies and various data types have unique identifiers, which are respectively also shortened to "UID". In line with another refinement of the invention, provision is made for separate indices to be recorded for the buffer store and for the archive store; this explicit association of the indices with the respective memory simplifies data management. It is thus possible, inter alia, to store the indices on the respective memory.

In line with one refinement of at least one embodiment, the management component includes a first management unit for the buffer store and a second management unit for the archive store; these management units are designed to record a separate index for the buffer store and for the archive store. This division of tasks allows particularly low-complexity separate recording of the two indices.

Interchange of index data between the index for the buffer store, on the one hand, and the index for the archive store, on the other hand, means that the indices have not only index data for the respective associated memories but also index data about the respective other memory. This firstly increases the data redundancy and hence security for storing the indices and secondly simplifies the search for particular image data.

In line with another refinement of at least one embodiment, requests for loading particular image data to the buffer store or to the archive store are forwarded to a network node storing the respective image data using the index, particularly one recorded separately for the buffer store and the archive store, if said stores do not store the respective requested image data. This allows loading requests to be sent both to the buffer store and to the archive store, since if the image data are not present in the respective queried memory then image data can be loaded from the respective other memory without needing to send fresh loading requests—this time to the other memory.

Advantageously, the first and/or second management unit is designed specifically also to receive the requests for loading particular image data; this extension of the function of the respective management unit beyond recording the respective indices means that the crucial memories, relating to the respective index, and loading operations per memory are managed by a single unit in a simple and low-complexity manner. In line with another refinement of at least one embodiment, provision is made for the first management unit for the buffer store and/or the second management unit for the archive store to be designed such that requests for loading particular image data to the first or the second management unit are forwarded to the respective other, second or first, management unit if the buffer store or the archive store does not contain the respective requested image data; this close connection between the two management units, which respectively control the loading access to the respective associated memory separately, allows particularly rapid access to the desired image data without an otherwise possibly necessary second request. Forwarding the loading request by the first or second management unit only when it is possible to tell from the respective index for the first or second management unit that the respective image data are stored in the respective other, archive or buffer, store prevents futile forwarding of the loading request right from the start and hence saves time.

In line with another refinement of at least one embodiment, provision is made for at least two network nodes to be respectively used as buffer stores and/or archive stores. This allows the storage capacity to be easily increased. In addition, it is possible for various locations within the data network to be provided with memories which respectively allow particularly rapid data accessibility for various other network nodes.

Designing the management component, particularly the first and/or the second management unit for the buffer store or the archive store, respectively, to regulate the storage of the respective image data simplifies the recording of the index data by the management component during storage, since, in line with this refinement, the management component is responsible both for the storage itself and for the indexing during storage.

Designing the at least one computer node to store the respective image data on the basis of a selection rule allows the image data to be stored at a respective appropriate computer node as opposed to random storage. The use of selection rules is expedient particularly when a plurality of network nodes are provided as buffer stores or as archive stores. By way of example, the selection rules may be chosen such that a network node is selected on the basis of its available storage space and/or on the basis of its current reading and writing activity.

In line with another refinement of at least one embodiment, the selection rules are designed such that image data from a group of cohesive image data are stored at various computer nodes. In this case, portions of the image data can be stored at various computer nodes in parallel in order to increase the redundancy of the data storage, or the image data can be stored in distributed form in order to allow an even utilization level for the memories. By way of example, provision might be made for the various series from the same study to be stored simultaneously at various computer nodes in distributed form, so that the total time for storing the image data is reduced.

Parallel loading of image data from the group of associated image data which are stored at various computer nodes from these various computer nodes can increase the loading speed. This makes particularly efficient use of the structure of the data network with the distributed memories. This parallel loading of image data is possible both when the same image data are stored redundantly in a plurality of memories and when various portions of the image data from the associated group of image data are stored in various memories in distributed form.

BRIEF DESCRIPTION OF THE DRAWINGS

The invention and further advantageous refinements of the invention are explained in more detail below schematically in the drawing with reference to example embodiments without this being a restriction of the invention. In the figures.

DETAILED DESCRIPTION OF THE EXAMPLE EMBODIMENTS

Figure 1:
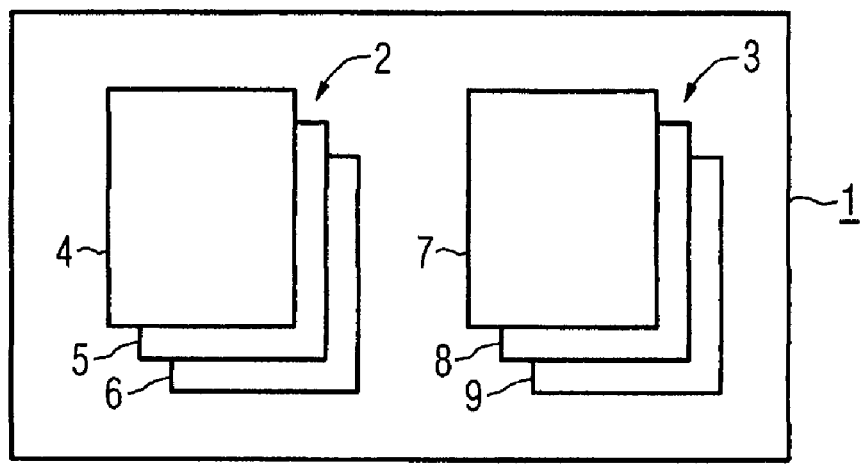
FIG. 1 shows the structure of a study with two series which respectively comprise three single images.

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the terms "and/or" and "at least one of" include any and all combinations of one or more of the associated listed items.

FIG. 1 shows a study 1 which comprises two series 2, 3. The series 2 contains three instances in the form of single images 4-6. The series 3 likewise contains three single images 7-9. In this example embodiment, a study based on the DICOM standard is involved. Apart from single images 4-9, there are further DICOM instances, such as what are known as structured documents and what are known as multicomponent objects. These multicomponent objects also include the DICOM multiframe objects, such as in Enhanced MR, CT and XA. The study 1, the series 2, 3 and the single images 4-9 are referred to here and below in summary as examples of image data.

Figure 2:
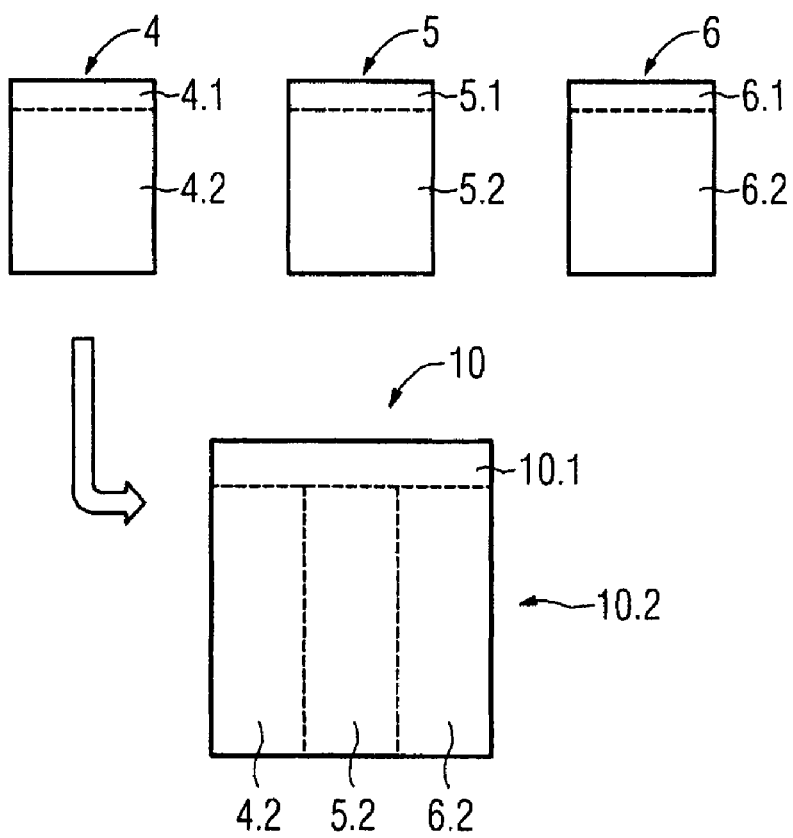
FIG. 2 shows the combination of three single images from a series to form a single multicomponent object.

The top half of FIG. 2 shows the three single images 4-6, which respectively comprise what is known as a header (image header) 4.1, 5.1 and 6.1 and pixel data 4.2, 5.2 and 6.2. The respective DICOM header 4.1, 5.1, 6.1 contains respective image-related supplementary data, such as the respective study 1, the respective series 2, an explicit identifier for the respective single image 4-6 and a name and also an explicit identification flag for the respective patient. Since the headers in a common group, as in this example of a common series 2, contain many redundant supplementary data, it is possible, by combining the single images 4-6 to form a multicomponent object with a single header 10, to reduce the number of redundant data items. In this example, the headers 4.1, 5.1, 6.1 have been combined to form the header 10.1 of the multicomponent object 10, with the pixel data 10.2 of the multicomponent object 10 containing a string of the pixel data 4.2, 5.2, 6.2 from the single images 4-6. For the respective image data 4.2, 5.2 and 6.2, individual metadata from the DICOM headers 4.1, 5.1 and 6.2 are not combined in the header 10.1 of the multicomponent object 10, but rather are associated with the respective image data 4.2, 5.2 and 6.2 as what are known as "per frame headers". The "per frame headers" are not shown to preserve the clarity of the drawing. The collection of the pixel data 10.2 comprising the pixel data 4.2, 5.2, 6.2 from the three single images 4-6 is also called a stack. Single images contained in a series in the form of layer images obtained by means of a layer-image diagnostic method such as computer tomography or magnetic resonance imaging can be combined particularly well to form a multicomponent object, since the respective headers of the single images have a particularly high level of redundancy.

Figure 3:
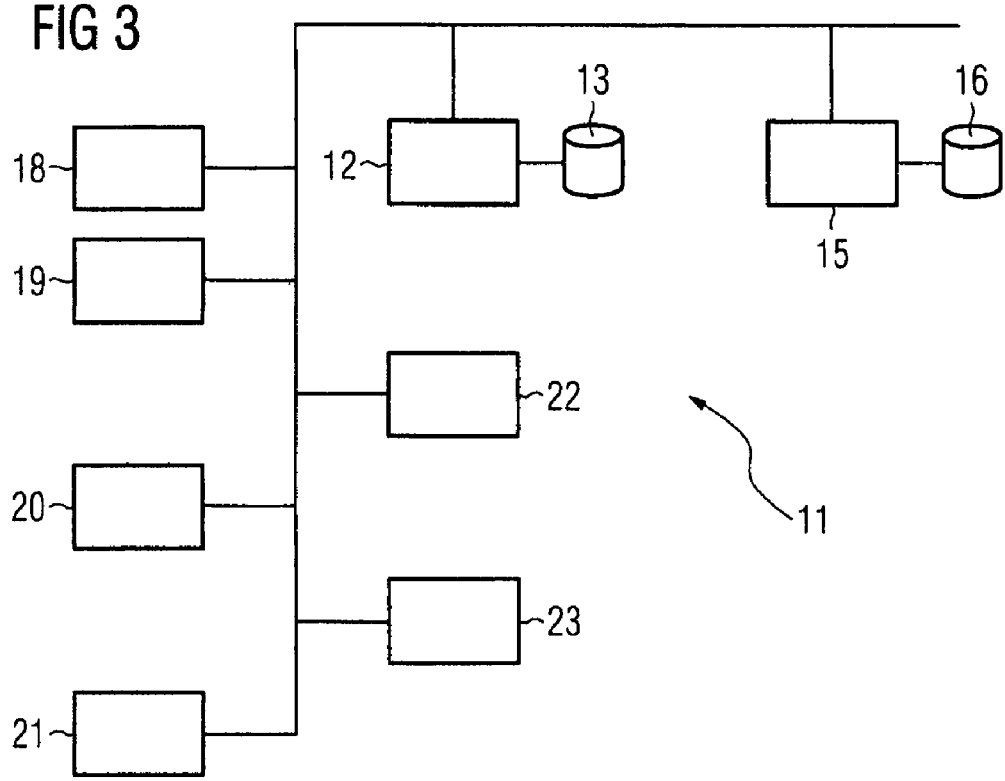
FIG. 3 shows a data network containing modalities, workstations, a buffer store and an archive store, where the memories are respectively managed by a separate memory unit.

FIG. 3 shows a data network 11 having a management component including a first management unit 12 for a buffer store 13 and including a second management unit 15 for an archive store 16, the buffer store 13 and the archive store 16 respectively being able to be addressed as network nodes within the data network 11. In addition, the data network 11 has two modalities 18, 19, two workstations 21, a configuration server 22 and an application server 23 connected to it.

In a typical application situation, the image data 1-10 are produced by the modality 18 or by the modality 19 and are sent for buffer-storage to the first management unit 12 for the buffer store 13. The first management unit 12 sends the image data 1-10 on to the buffer store 13 and records a reference to this buffer store in connection with an explicit identifier for the respective image data 1-10 in an index. This index may be created in the form of a table, for example, which contains a first column for the explicit identifier and a second column with reference to the respective network node. To simplify and speed up a search for particular image data 1-10, further columns of the index record further image-related supplementary data, such as the respective study, the respective series and/or the respective patient.

In a subsequent step, the image data 1-10 buffer-stored in the buffer store 13 are transmitted to the second management unit 15, which firstly transmits the image data 1-10 on to the archive store 16 and secondly records a reference to this archive store 16 in connection with the explicit identifier for the respective image data 1-10 in a separate index for the archive store 16. After a prescribed time interval or when a particular memory space has been used up in the buffer store 13, the image data 1-10 which are now archived in the archive store 16 are deleted from the buffer store 13. Control of this deletion process, which is dependent on particular criteria, is undertaken by the first management unit 12.

First of all, separate indices for the buffer store 13, on the one hand, and the archive store 16, on the other hand, record merely index data for the image data 1-10 which are stored in the respective memory. At particular intervals, the management units 12, 15 interchange the index data contained in their respective index with one another, so that the two separate indices are brought to a synchronized level of the index data. In this way, the two management units 12, 15 can use the respective locally stored indices to ascertain, easily and quickly, the network node, that is to say the buffer store 13 or the archive store 16, at which the respective image data 1-10 are stored.

The workstations 20, 21 respectively include a desktop computer (workstation) from which it is possible to access the image data 1-10 in the buffer store 13 or in the archive store 16. To load image data 1-10, the respective desktop computer first of all sends a request to load the image data 1-10 to one of the two management units 12, 15, which uses the respective index stored in the first management unit 12 or in the second management unit 15 to ascertain the at least one network node from the explicit identifier for the respective image data 1-10. If, by way of example, the loading request is first of all sent to the first management unit 12, and if the latter uses the locally stored index to establish that the requested image data 1-10 are stored in the buffer store 13, then the first management unit 12 initiates the loading process for the image data 1-10 directly. As a result, the image data 1-10 are transmitted from the buffer store 13 to the workstation 20 or 21 and are displayed there. If the first management unit 12 establishes that the requested image data 1-10 are not stored in the buffer store 1-13 but rather in the archive store 16, however, then the first management unit 12 forwards the loading request to the second management unit 15, which then initiates the loading process. If the first management unit 12 establishes that the requested image data 1-10 are stored neither in the buffer store 13 nor in the archive store 16 then the first management unit 12 provides the respective workstation 20 or 21 with an appropriate acknowledgement of the loading request.

Since the image data 1-10, having been transmitted to the archive store 16, are not immediately deleted from the buffer store 13, the image data 1-10 are available for loading both in the buffer store 13 and in the archive store 16 for a changeover time. Using the respective stored index, both the first management unit 12 and the second management unit 15 can establish that the image data 1-10 in such a case are available in the buffer store 13 and in the archive store 16 in parallel. If the first management unit 12 or the second management unit 15 then receives a request to load the respective image data 1-10, a parallel loading process is initiated by the buffer store 13 and the archive store 16. If, by way of example, the study 1 shown in FIG. 1 with the two series 2 and 3 of roughly equal magnitude is stored both in the buffer store 13 and in the archive store 16 then the series 2 can be loaded from the buffer store 13 and the series 3 can be loaded from the archive store 16 in parallel. This simultaneous loading process allows the transmission speed to the respective workstation 20 or 21 to be significantly increased.

Buffer-storage of the respective image data 1-10 in the buffer store 13 without immediate transmission of these image data 1-10 to the archive store 16 allows the buffer-stored image data 1-10 to be displayed and, if appropriate, edited on a workstation 20 or 21 first of all and relevant image data 1-10 to be selected for long-term archiving purposes. Only these image data 1-10 marked as relevant are finally transmitted from the buffer store 13 to the archive store 16 for archiving; the remaining image data 1-10 are temporarily kept in the buffer store 13 still. The transmission of merely selected image data 1-10 reduces the data volume of the image data 1-10 transmitted to the archive store 13.

Typically, a memory type which is faster and smaller in comparison with the archive store 16 is used for the buffer store 13. This allows faster access to image data 1-10 which have been produced a short time ago and are therefore still stored in the buffer store 13 than to older image data 1-10 which are still only present in the archive store 16 after a particular time. This results in a speed advantage when loading image data 1-10, particularly when loading image data 1-10 which have been produced only a short time ago and therefore have a particularly high probability of needing to be loaded. The fast loading and storage speed for the buffer store 13 has a particular effect when merely selected image data 1-10 are transmitted to the slower archive store 16.

The archive store 16 contains various memory types which are used for hierarchic memory management, i.e. the image data 1-10 in the archive store 16 are first of all removed to memory areas with faster access and are then subsequently transferred to slower storage media such as tapes. In this example embodiment, the archive store 16 is in the form of a PACS.

Particular image data 1-10 can be selected either automatically or manually using one of the workstations 20 or 21. By way of example, the selected image data 1-10 can be marked using a "to be archived flag". When the image data 1-10 have been transmitted from the buffer store 13 to the archive store, the flag value is changed from "to be archived" to "save to delete". Image data 1-10 marked in this manner are deleted from the buffer store 13 either immediately or after a predetermined interval of time. The buffer store 13 may also be referred to as "short term storage" (STS) and the archive store 16 may also be referred to as "long term storage" (LTS).

Figure 4:
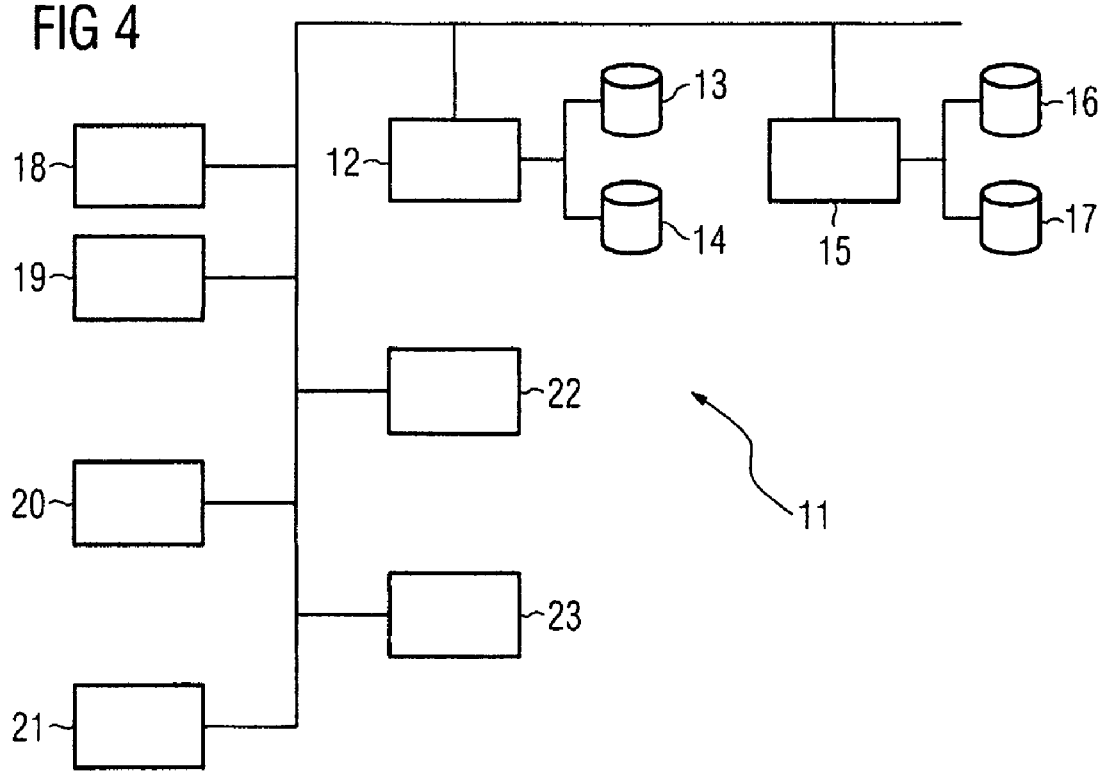
FIG. 4 shows the data network shown in FIG. 3 with two buffer stores and two archive stores in which the image data are respectively stored in distributed form and in parallel.

FIG. 4 shows the data network 11 shown in FIG. 3, with the one buffer store 13 being replaced by two buffer stores 13, 14 and the one archive store 16 being replaced by two archive stores 16, 17.

The buffer stores 13 and 14 do not—as shown—have to be directly connected merely to the first management unit 12 but rather may also have a direct data link to the data network 11. By way of example, it is possible to arrange the buffer stores 13 and 14 locally at various locations within the data network 11 such that they respectively ensure a particularly high data transfer rate to different network nodes, such as modalities 18, 19 or workstations 20, 21. A similar situation applies to the archive stores 16 and 17.

If the image data 1-10 produced by the modality 18 or 19 are sent to the first management unit 12, the latter takes a selection rule as a basis for reading the respective buffer store 13 or 14 in which the respective image data 1-10 are stored.

In line with a first alternative, the selection rule is set up such that the incoming image data 1-10 are distributed over the two buffer stores 13 and 14, so that the storage speed is increased by the distributed simultaneous storage in two buffer stores. If the same image data 1-10 are requested for loading, these image data 1-10 can be loaded from both buffer stores 13 and 14 in parallel, so that a speed advantage is also obtained for this loading process. A similar situation applies to distributed storage of the image data 1-10 in the archive stores 16 and 17.

In line with a second alternative, the image data 1-10 are stored in parallel in both buffer stores 13 and 14, so that the full image data 1-10 are respectively stored in the buffer store 13 and the buffer store 14. On the one hand, this results in increased security, since two copies of the same image data 1-10 are present simultaneously, and on the other hand, this parallel storage allows increased speed for the loading process, since the image data 1-10 can be loaded from two buffer stores 13 and 14 simultaneously. This alternative can also be transferred to the archive stores 16 and 17 accordingly.

By way of example, the selection rule is based on the hierarchic structure of the respective image data 1-10. The selection rule can start either at the hierarchic level of the study 1, so that the series 2 and 3 in this study 1 are stored in different buffer stores 13 and 14, or at the hierarchic level of the series 2, 3 so that the individual images in the series 2 or 3 are distributed alternately over the buffer stores 13 and 14. The study 1 and the series 2 and 3 are respectively a group of cohesive images 4-9.

If images from one group are requested for loading and if these images are stored in distributed form or in parallel in the buffer stores 13, 14 then the option of loading the image data 1-10 from the two buffer stores 13 and 14 in parallel results in a speed advantage.

The selection rule may be based not only on the hierarchy of the study, series and single images but also on a patient-related hierarchy or else on an anatomic association for single images which is determined from the DICOM entry "Primary Anatomic Structure Sequence" (DICOM tag 0008,2228) for example.

In this example embodiment, the selection rule is stipulated by what is known as a hash function H: $X \rightarrow A$, which maps the explicit identifier X for the image data 1-10 into the address space A of the network nodes 13, 14, 16, 17. The explicit identifier used is simply what is known as a DICOM-UID. Possible suitable DICOM-UIDs are the "Study Instance UID", the "Series Instance UID" or the SOP "Instance UID"; in addition, the stack ID may also be used. Through the suitable choice of the selection rule, which can also be called a distribution strategy, it is possible to distribute the load falling on the individual network nodes 13, 14, 16, 17 during storage when loading too. It is possible either to store a single selection rule centrally or else to store separate selection rules locally in the first management unit 12 and in the second management unit 15.

The configuration server 22 is used, inter alia, to store and provide further configuration data, such as the respective IP addresses of the network nodes in the data network 11. The application server 23 provides various services in the data network 11, e.g. for the workstations 20 and 21.

One possible refinement of at least one embodiment of the invention may be summarized as follows: to increase the efficiency of the management of image data in a data network having a multiplicity of network nodes, at least one embodiment of the present invention provides for image data, having been stored at a network node provided as a buffer store, to be transmitted for archiving to a network node provided as an archive store and to be stored there, with the storage of the respective image data in the buffer store and in the archive store involving a reference to the respective network node being recorded in an index in conjunction with an explicit identifier for the respective image data, said index being used when the stored image data are subsequently loaded to ascertain the respective at least one network node at which the respective image data are stored.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks™, cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for managing medical image data in a data network including a multiplicity of network nodes, the method comprising:
   a first management process for buffer-storing the image data, in which the respective image data are stored at a network node provided as a buffer store;
   a second management process for archiving the image data, in which the respective image data are transmitted from the buffer store to a network node provided as an archive store and are stored in this archive store, where the storage of the respective image data in the buffer store and in the archive store involves a reference to the respective network node being recorded in an index in conjunction with an explicit identifier for the respective image data; and
   a third management process for loading the image data, in which the index is used to ascertain the at least one network node at which the respective image data are stored, and the respective image data are loaded from this at least one network node, wherein
   the first management process and the second management process record separate indices for the buffer store and the archive store,
   the third management process is capable of sending loading requests to both the buffer store and the archive store using the separate indices, and
   index data are interchanged between the index for the buffer store and the index for the archive store to synchronize the indices.

2. The method as claimed in claim 1, wherein the at least one network node at which the respective image data are stored is ascertained from its explicit identifier.

3. The method as claimed in claim 2, wherein only previously selected image data are transmitted from the buffer store to the archive store.

4. The method as claimed in claim 1, wherein only previously selected image data are transmitted from the buffer store to the archive store.

5. The method as claimed in claim 4, wherein the unselected image data are deleted.

6. The method as claimed in claim 5, wherein the unselected image data are deleted on the basis of at least one of a remaining storage space in the buffer store and a particular time interval elapsing from transmission of the image data to the archive store.

7. The method as claimed in claim 1, wherein the index records image-related supplementary data.

8. The method as claimed in claim 7, wherein the at least one network node which respectively stores particular search criteria for image data complying with the supplementary data is ascertained using the index.

9. The method as claimed in claim 8, wherein image data based on the DICOM standard are used and the index records supplementary data in the form of DICOM metadata associated with the respective image data.

10. The method as claimed in claim 7, wherein image data based on the DICOM standard are used and the index records supplementary data in the form of DICOM metadata associated with the respective image data.

11. The method as claimed in claim 10, wherein the DICOM metadata are recorded in the form of an identifier for at least one of the respective patient, the respective study, the respective series and the respective instance of the image data.

12. The method as claimed in claim 1, wherein the explicit identifier recorded is a respective "unique identifier" based on the DICOM standard.

13. The method as claimed in claim 1, wherein requests for loading particular image data to at least one of the buffer store the archive store are forwarded to a network node storing the respective image data using the index, if said stores do not store the respective requested image data.

14. The method as claimed in claim 1, wherein at least two respective network nodes are provided as at least one of buffer stores and archive stores.

15. The method as claimed in claim 1, wherein the at least one computer node is selected for the purpose of storing the respective image data on the basis of a selection rule.

16. The method as claimed in claim 15, wherein the selection rule is in a form such that a group of associated image data are stored at various computer nodes in at least one of parallel and distributed form.

17. The method as claimed in claim 1, wherein image data from the group of associated image data which are stored at various computer nodes are loaded from these computer nodes in parallel.

18. A data network including a multiplicity of network nodes for managing medical image data, comprising:
   a network node, provided as a buffer store, firstly for storing the respective image data and secondly for loading the image data from this buffer store;
   a network node, provided as an archive store, firstly for storing the image data transmitted from the buffer store and secondly for loading the image data from this archive store; and
   a management component firstly for recording a reference to the respective network node at which the respective image data are stored in conjunction with an explicit identifier for the respective image data in an index and secondly for ascertaining at least one network node at which the respective image data are stored and from which the image data are loadable, using the index, wherein
   the management component includes a first management unit for the buffer store and a second management unit for the archive store, which are respectively configured to record a separate index for the buffer store and for the archive store, the management component is configured to send loading requests to both the buffer store and the archive store using the separate indices, and the management units are configured to reciprocally interchange their respective index data to synchronize the indices.

19. The data network as claimed in claim 18, wherein provision is made for the network node at which the respective image data are stored to be ascertained from its explicit identifier.

20. The data network as claimed in claim 19, wherein provision is made for merely previously selected image data to be transmitted from the buffer store to the archive store.

21. The data network as claimed in claim 18, wherein provision is made for merely previously selected image data to be transmitted from the buffer store to the archive store.

22. The data network as claimed in claim 21, wherein provision is made for the unselected image data to be deleted.

23. The data network as claimed in claim 21, wherein provision is made for the unselected image data to be deleted on the basis of at least one of the remaining storage space in the buffer store and a particular time interval elapsing from storage of the respective image data in the archive store.

24. The data network as claimed in claim 18, wherein the management component is designed to record image-related supplementary data in the index.

25. The data network as claimed in claim 24, wherein the management component is designed to ascertain the at least one network node which respectively stores particular search criteria for image data complying with the supplementary data.

26. The data network as claimed in claim 24, wherein provision is made for management of image data based on the DICOM standard whose DICOM metadata is recordable in the index as supplementary data.

27. The data network as claimed in claim 26, wherein the management component is designed to record the DICOM metadata in the form of the respective patient format least one of the respective study, the respective series and the respective instance of the image data.

28. The data network as claimed in claim 18, wherein the management component is designed to record a respective "unique identifier" based on the DICOM standard as the explicit identifier.

29. The data network as claimed in claim 18, wherein the management component is designed such that requests for loading particular image data to the buffer store and to the archive store are forwardable to a network node storing the respective image data using the index if said stores do not store the respective requested image data.

30. The data network as claimed in claim 18, wherein at least one of the first and second management unit is designed to receive the requests for loading particular image data.

31. The data network as claimed in claim 30, wherein at least one of the first management unit for the buffer store and the second management unit for the archive store is designed such that requests for loading particular image data to at least one of the first and the second management unit are forwardable to the respective other one of the second and first management unit if at least one of the buffer store and the archive store does not contain the respective requested image data.

32. The data network as claimed in claim 31, wherein at least one of the first and the second management unit is designed such that the request can be forwarded to the respective other one of the second and first management unit only if it is possible to tell from the respective index of the at least one of the first and the second management unit that the respective image data are stored in the respective other one of the archive and buffer.

33. The data network as claimed in claim 18, wherein at least two respective network nodes are provided as at least one of buffer stores and archive stores.

34. The data network as claimed in claim 18, wherein the management component is designed to regulate the storage of the respective image data.

35. The data network as claimed in claim 34, wherein the management component is designed such that the at least one network node for storing the respective image data is selectable on the basis of a selection rule.

36. The data network as claimed in claim 35, wherein the selection rule is designed such that the image data from a group of associated image data is storable at various network nodes in at least one of parallel and distributed form.

37. The data network as claimed in claim 18, wherein the management component is designed such that image data from the group of associated image data which are stored at various network nodes is loadable from this network node in parallel.

38. A data network including a multiplicity of network nodes for managing medical image data, comprising:

a network node, provided as a buffer store, firstly for storing the respective image data and secondly for loading the image data from the buffer store;

a network node, provided as an archive store, firstly for storing the image data transmitted from the buffer store and secondly for loading the image data from this archive store; and a management component firstly for recording a reference to the respective network node at which the respective image data are stored in conjunction with an explicit identifier for the respective image data in an index and secondly for ascertaining at least one network node at which the respective image data are stored and from which the image data are loadable, using the index, wherein the management component records separate indices for the buffer store and the archive store, the management component is configured to send loading requests to both the buffer store and the archive store using the separate indices, and index data are interchanged between the index for the buffer store and the index for the archive store to synchronize the indices.

* * * * *